United States Patent [19]

Diehl

[11] Patent Number: 5,265,891
[45] Date of Patent: Nov. 30, 1993

[54] JOGGER'S BABY CARRIAGE APPARATUS

[76] Inventor: Stuart L. Diehl, 633 Milky Way, Denver, Colo. 80221

[21] Appl. No.: 9,024

[22] Filed: Jan. 26, 1993

[51] Int. Cl.⁵ ............................................. B62D 51/04
[52] U.S. Cl. .................... 280/1.5; 280/204; 280/47.25; 280/68; 280/76
[58] Field of Search ............. 280/1.5, 204, 63, 30, 280/647, 648, 650, 657, 658, 47.25, 7.15, 24, 283, 290, 288.2, 292, 304.5, 65, 66, 67, 68, 69, 70, 72, 71, 75, 76, 43, 416

[56] References Cited

U.S. PATENT DOCUMENTS

| | | | |
|---|---|---|---|
| 4,392,663 | 7/1983 | Forsland | 280/68 |
| 4,695,072 | 9/1987 | Brooks | 280/47.25 |
| 4,848,780 | 7/1989 | Straub | 280/1.5 |
| 5,062,651 | 11/1991 | Varieur | 280/1.5 |
| 5,076,599 | 12/1991 | Lockett et al. | 280/204 |
| 5,176,395 | 1/1993 | Garforth-Bies | 280/204 |

FOREIGN PATENT DOCUMENTS 3807449  9/1989  Fed. Rep. of Germany ....... 280/1.5

*Primary Examiner*—Richard M. Camby
*Attorney, Agent, or Firm*—Leon Gilden

[57] ABSTRACT

A frame assembly removably mounts a coach member thereon, wherein the frame member assembly includes spring members to cushion the coach member mounting to the frame assembly, with the frame assembly further including first and second harness tubes to accommodate pivoting of a torso harness worn by an individual transporting the carriage structure.

5 Claims, 4 Drawing Sheets

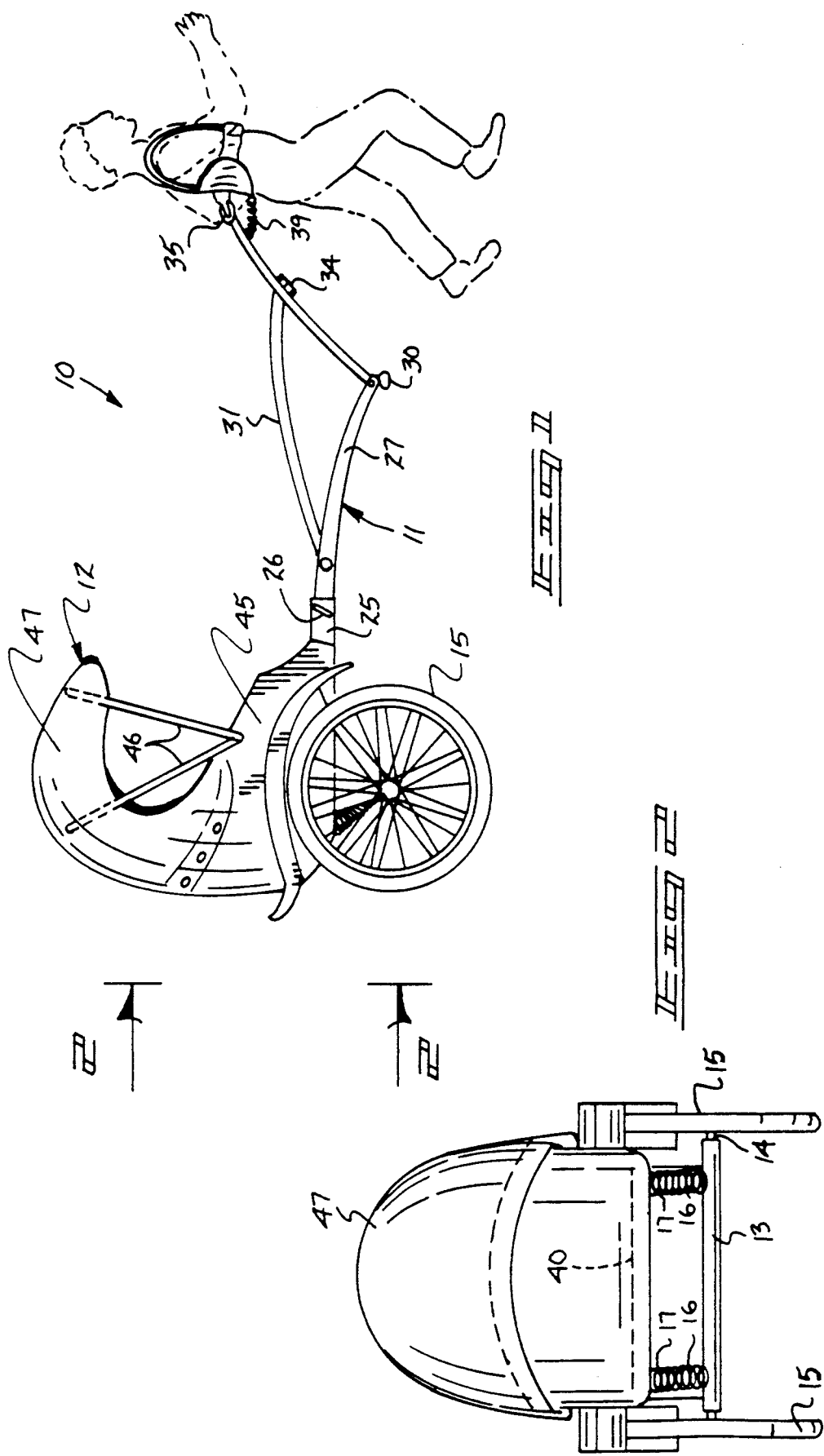

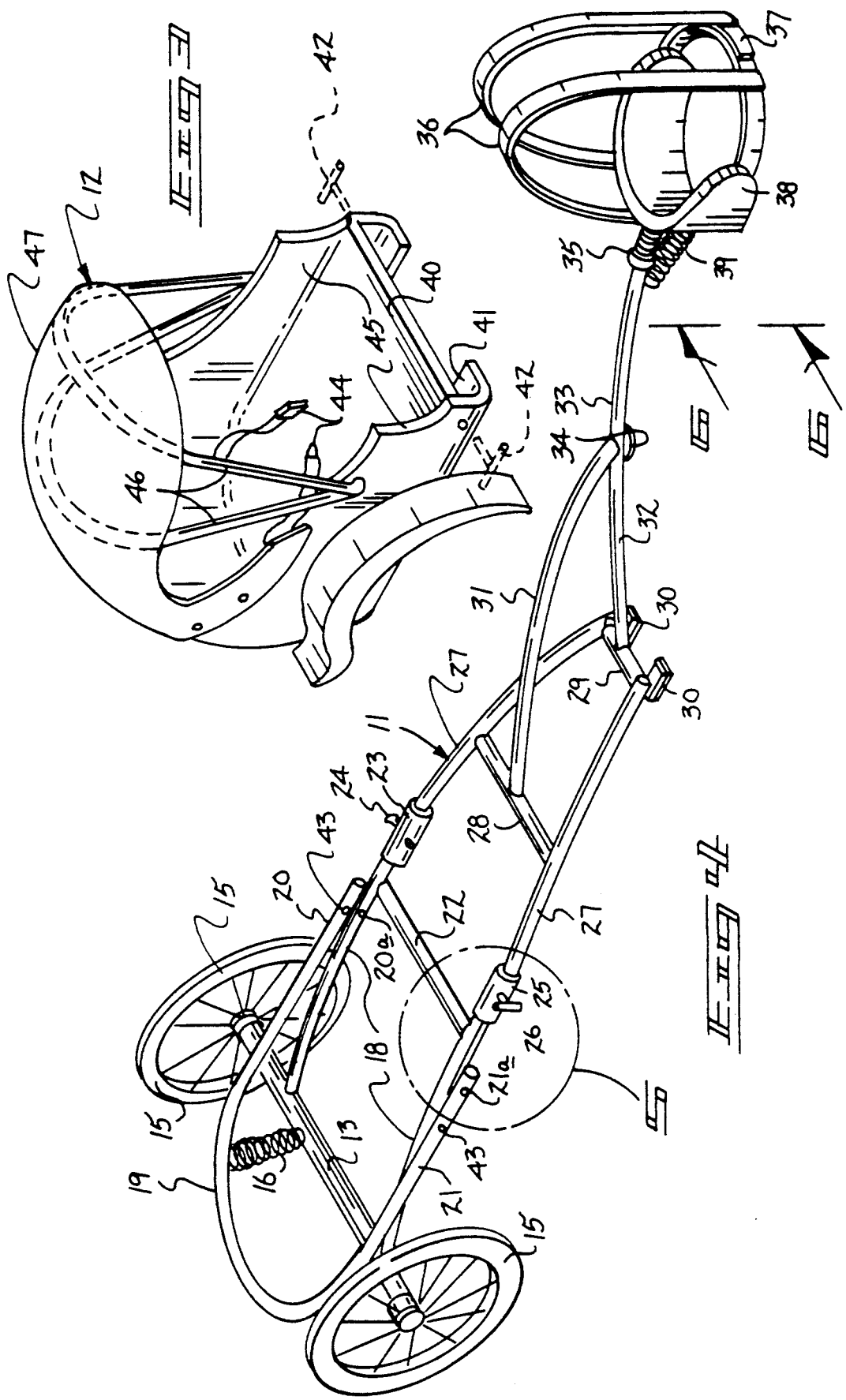

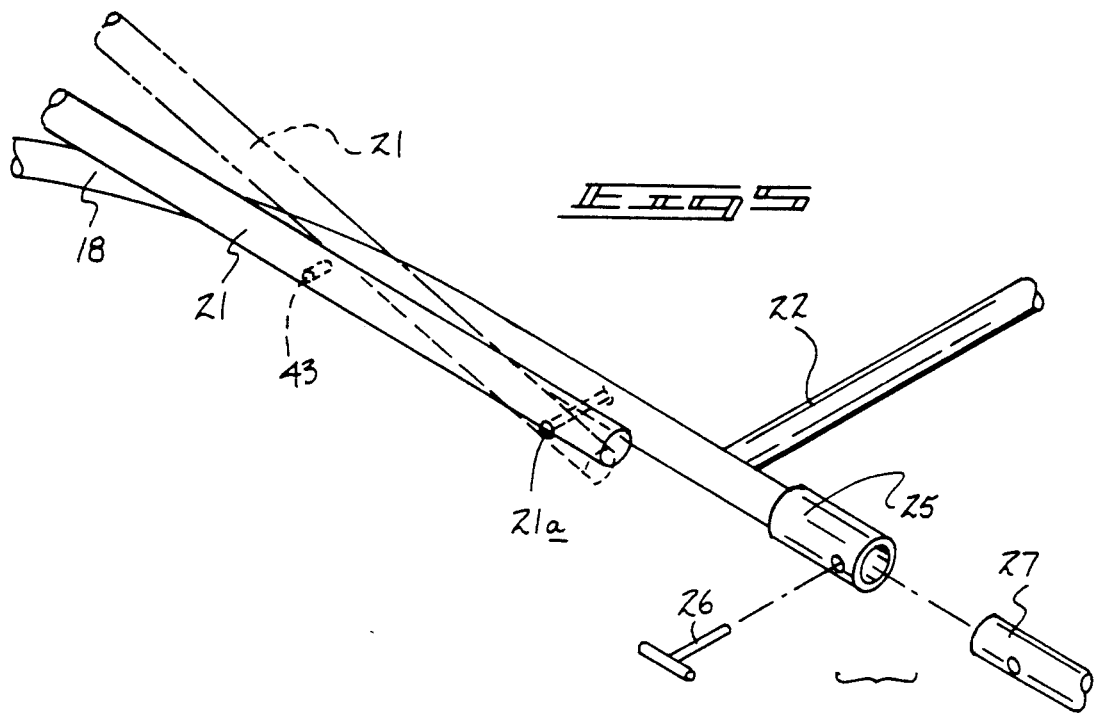
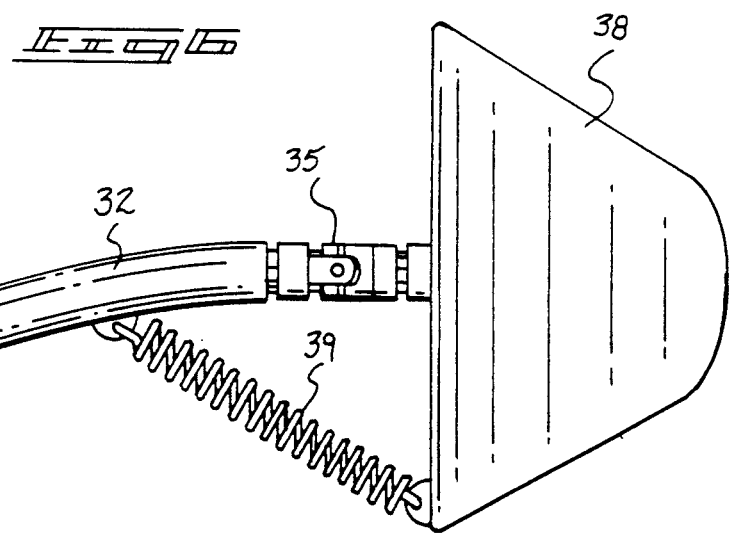

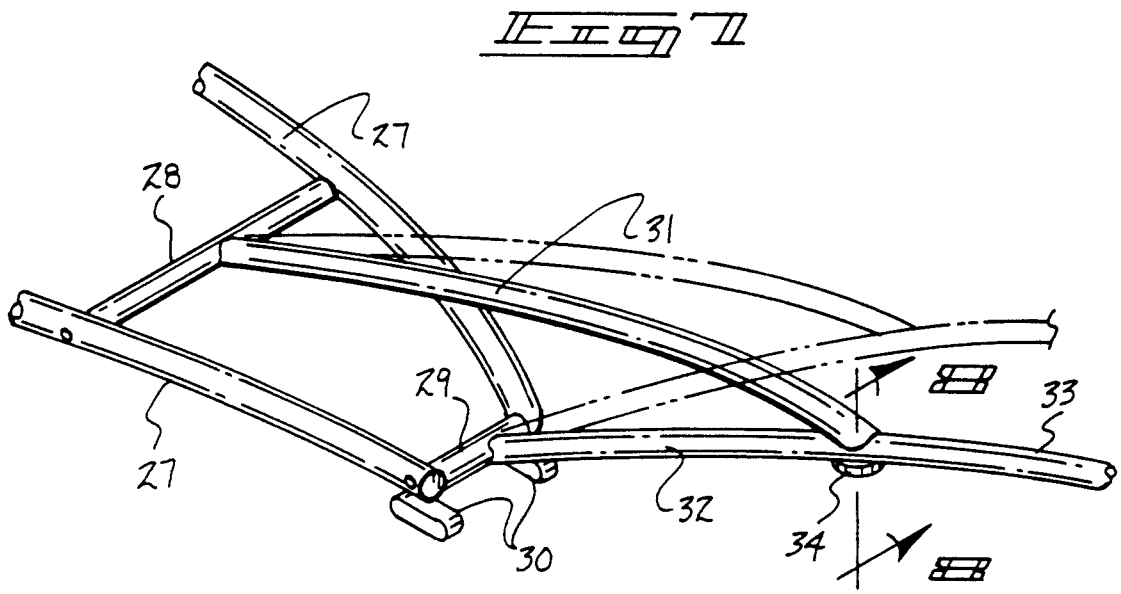
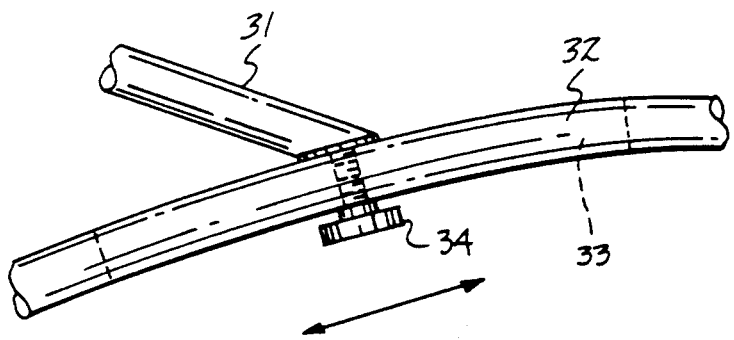

5,265,891

JOGGER'S BABY CARRIAGE APPARATUS

BACKGROUND OF THE INVENTION

1. Field of the Invention

The field of invention relates to baby carriage structure, and more particularly pertains to a new and improved jogger's baby carriage apparatus wherein the same is directed to permit ease of transport of a carriage structure by an individual engaged in a jogging or exercise event.

2. Description of the Prior Art

The use of baby carriages mounted to an individual participating in a walking or jogging event is presented in the prior art and exemplified by the U.S. Pat. Nos. 4,848,780; 4,306,733; 4,695,072; 4,838,565; and 5,062,651.

The instant invention attempts to overcome deficiencies of the prior art by providing for freedom of movement in the mounting and positioning of a frame assembly for transport of a baby carriage having a baby or infant mounted therewithin and in this respect, the present invention substantially fulfills this need.

SUMMARY OF THE INVENTION

In view of the foregoing disadvantages inherent in the known types of baby carriage apparatus now present in the prior art, the present invention provides a jogger's baby carriage apparatus wherein the same employs a breakdown assembly arranged to accommodate impact during the towing of the carriage structure. As such, the general purpose of the present invention, which will be described subsequently in greater detail, is to provide a new and improved jogger's baby carriage apparatus which has all the advantages of the prior art baby carriage apparatus and none of the disadvantages.

To attain this, the present invention provides a frame assembly removably mounting a coach member thereon, wherein the frame member assembly includes spring members to cushion the coach member mounting to the frame assembly, with the frame assembly further including first and second harness tubes to accommodate pivoting of a torso harness worn by an individual transporting the carriage structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved jogger's baby carriage apparatus which has all the advantages of the prior art baby carriage apparatus and none of the disadvantages.

It is another object of the present invention to provide a new and improved jogger's baby carriage apparatus which may be easily and efficiently manufactured and marketed.

It is a further object of the present invention to provide a new and improved jogger's baby carriage apparatus which is of a durable and reliable construction.

An even further object of the present invention is to provide a new and improved jogger's baby carriage apparatus which is susceptible of a low cost of manufacture with regard to both materials and labor, and which accordingly is then susceptible of low prices of sale to the consuming public, thereby making such jogger's baby carriage apparatus economically available to the buying public.

Still yet another object of the present invention is to provide a new and improved jogger's baby carriage apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of the invention.

FIG. 2 is an orthographic view, taken along the lines 2—2 of FIG. 1 in the direction indicated by the arrows.

FIG. 3 is an isometric illustration of the coach member of the invention.

FIG. 4 is an isometric illustration of the frame assembly employed by the invention.

FIG. 5 is an enlarged isometric illustration of section 5 as set forth in FIG. 4.

FIG. 6 is an orthographic view, taken along the lines 6—6 of FIG. 4 in the direction indicated by the arrows.

FIG. 7 is an isometric illustration of the mounting of the harness tubes relative to the torso harness of the invention.

FIG. 8 is an enlarged orthographic view, taken along the lines 8—8 of FIG. 7 in the direction indicated by the arrows.

DESCRIPTION OF THE PREFERRED EMBODIMENT

With reference now to the drawings, and in particular to FIGS. 1 to 8 thereof, a new and improved jogger's baby carriage apparatus embodying the principles and concepts of the present invention and generally designated by the reference numeral 10 will be described.

More specifically, the jogger's baby carriage apparatus 10 of the instant invention essentially comprises a frame assembly 11 having a coach member 12 removably mounted relative to the frame assembly, in a manner as indicated in FIGS. 3 and 4.

The frame assembly 11 includes an axle tube 13 having an axle 14 rotatably mounted therethrough, with the axle 14 including wheel members 15 rotatably mounted at each end of the axle 14. A plurality of spaced spring members 16 are fixedly mounted at their lowermost ends to the axle tube 13 and received within spring cups 17 within the coach member 12, and more specifically, the coach member floor 40 and its bottom surface. Frame first rails are orthogonally directed in fixed communication with the axle tube 13, with the frame first rails 18 arranged in a parallel coextensive relationship, as indicated in FIG. 4. A U-shaped carriage rail 19 having first and second carriage rails 20 and 21 are pivotally mounted about respective first and second carriage rail axles 20a and 21a respectively to one of the frame first rails 18. A first cross tube 22 is orthogonally mounted between the frame first rails 18 to provide geometric integrity to the frame first rail structure. First and second lock sleeves 23 and 25 respectively are mounted to opposed free ends of an individual frame first rail 18, with the first and second lock sleeves 23 and 25 having respective first and second lock sleeve fasteners 24 and 26 to secure an individual frame second rail 27 within each of the first and second lock sleeves 23 and 25. A second cross tube 28 is pivotally mounted between the spaced frame second rails 27 in a spaced relationship relative to the first and second lock sleeves 23 and 25 and intermediate the first and second lock sleeves and a third cross tube 29 pivotally mounted between the spaced second rails 27. A plurality of support feet 30 are mounted to the free distal ends of the frame first rails as indicated for providing for support when the frame is in a rested position. A first harness tube 31 orthogonally intersects the second cross tube 28 and extends beyond the third cross tube 29. A second harness tube fixedly mounted at one of its ends to the third cross tube 29 includes a slot 33 to receive a first harness tube fastener 34 therethrough, that in turn is threadedly received within the second end of the first harness tube 31 to provide angular adjustment of the first harness tube relative to the second harness tube to accommodate various heights of individuals that in turn are secured to a torso support collar 38 that is mounted to the second end of the second harness tube about a pivot coupling 35. Shoulder straps 36 are mounted to the torso support collar 38 and to a torso waist strap assembly 37. A collar spring 39 is mounted between the torso support collar 38 and the second harness tube 32, in a manner as indicated in FIG. 6, to provide biased canting of the torso support collar 38 about an individual's torso portion.

The coach member 12 includes the coach member floor having a U-shaped channel 41 mounted to a bottom surface of the coach member floor, wherein the U-shaped channel 41 complementarily receives the U-shaped carriage rail 19, with channel fasteners 42 arranged for projection through the U-shaped channel 41 and received within latch bores 43 within the first and second carriage rails 20 and 21. A coach safety belt 44 is mounted within the coach relative to a top surface of the coach member floor 40, with the coach having a coach side wall 45 of a generally U-shaped configuration mounting roof ribs 46 that in turn secure a roof member 47 over the roof ribs 46 and utilizing conventional snap fasteners and the like to secure the roof member 47 to the coach side walls 45 permitting removal of the roof member 47 if desired or alternatively, the roof ribs 46 pivotally mounted to the side wall 45 is pivoted to provide collapse of the roof member 47 that is formed of a flexible material to expose a child within the coach member to sunlight and the like.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A jogger's baby carriage apparatus, comprising,
a frame assembly having an axle tube, with the axle tube including an axle member rotatably directed through the axle tube, with the axle member including a plurality of wheel members rotatably mounted to opposed ends of the axle member, and
the frame assembly further including at least first frame rails arranged in a parallel coextensive relationship, with the first frame rails including a first cross tube orthogonally and integrally directed interconnecting the first frame rails, each having a lock sleeve at a free distal end of each of the first frame rails spaced from the axle tube, and
a pivoting frame assembly pivotally mounted to the first frame rails intermediate the first cross tube and the axle tube, and
a coach member, the coach member including a coach member floor, with the coach member floor including a plurality of spring cups mounted to a bottom surface of the coach member floor, with a plurality of spring members fixedly mounted to the axle tube, with each of the spring members received within one of said spring cups, with the coach member arranged for sliding reception upon the pivoting frame assembly.

2. An apparatus as set forth in claim 1 including a plurality of second frame rails, wherein one of said plurality of second frame rails is received within one of said lock sleeves, with the second frame rails extending longitudinally beyond the first frame rails, with the second frame rails terminating in second frame rail free end portions, and the second frame rail free end portions include support feet, with at least one support foot of said support feet mounted to each second frame rail free end, and a third cross tube pivotally mounted in adjacency to the second frame rail free ends, and a second cross tube pivotally mounted to the second frame rails intermediate the third cross tube and the lock sleeves, and a first harness tube fixedly and orthogonally mounted to the second cross tube, and a second harness tube fixedly and orthogonally mounted to the third support tube, with the second harness tube having a slot, and the first harness tube having a first harness tube free end spaced from the second cross tube, with the first harness tube free end positioned over the slot, and a first harness tube fastener directed through the slot and received within the first harness tube free end providing adjustment of the first harness tube relative to the second harness tube along the slot.

3. An apparatus as set forth in claim 2 including a torso support collar, with the second harness tube having a second harness tube free end spaced from the third cross tube, and the second harness tube free end including a pivot coupling interconnecting the second harness tube free end and the torso support collar, and a collar spring mounted between the torso support collar and the second harness tube.

4. An apparatus as set forth in claim 3 wherein the coach member floor includes a U-shaped channel, and the pivoting frame assembly includes a U-shaped carriage rail member, wherein the U-shaped carriage member is complementarily received within the U-shaped channel, and channel fasteners are directed through the U-shaped channel and received within the U-shaped carriage rail member to selectively secure the coach member to the U-shaped carriage rail member.

5. An apparatus as set forth in claim 4 wherein the coach member floor includes a safety belt mounted to the coach member floor, and a U-shaped side wall, with roof ribs pivotally mounted to the U-shaped side wall, with the roof ribs mounting a roof member of flexible construction to the roof ribs and to the side wall.

* * * * *